United States Patent Office 2,825,722
Patented Mar. 4, 1958

2,825,722

PROCESS FOR THE POLYMERIZATION OF ALPHA-CHLOROACRYLONITRILE

Neville Douglas Lee, Sutton, England, assignor to The Distillers Company Limited, Edinburgh, Scotland, a British company No Drawing. Application February 1, 1954
Serial No. 407,563

Claims priority, application Great Britain
February 17, 1953

9 Claims. (Cl. 260—88.7)

This invention relates to the polymerization of α-chloroacrylonitrile and, in particular, to a process for the polymerization, including copolymerization, of α-chloroacrylonitrile whereby substantially colorless polymers are produced.

The preparation and polymerization of α-chloroacrylonitrile has already been proposed but it has now been found that most polymerization procedures result in the formation of dark colored polymers whose uses are limited by the discoloration. The production of dark colored polymers is particularly associated with the homopolymerization of α-chloroacrylonitrile and with the copolymerization of major proportions of α-chloroacrylonitrile with minor proportions of other copolymerizable compounds.

It has been found that poly-α-chloroacrylonitrile and copolymers of α-chloroacrylonitrile with other copolymerizable compounds, which contain at least 85% by weight of α-chloroacrylonitrile units in their molecular structure, are useful for the production of shaped articles, such as, for example, films and fibers. However, in the production of such articles which are to have commercial utility it is essential that the polymeric material used should be colorless or at most only slightly colored so that the resultant articles may themselves be substantially colorless or alternatively may be dyed to any suitable shade.

The object of the present invention is to provide a process for the polymerization and copolymerization of α-chloroacrylonitrile whereby substantially colorless or at most only slightly colored polymeric material may be produced.

It has now been discovered that substantially colorless polymeric material may be obtained by carrying out the polymerization of α-chloroacrylonitrile in an aqueous dispersion in the absence of molecular oxygen under certain polymerization conditions.

According to the present invention the process for the production of polymeric material comprises polymerizing in aqueous dispersion monomeric material comprising α-chloroacrylonitrile in the absence of free molecular oxygen and in the presence of a peroxidic catalyst and a polyfunctional, polymeric dispersing agent, the pH value of the aqueous phase of the dispersion being below 7.

The polymerization of the α-chloroacrylonitrile according to the process of the present invention may be brought about by the action of heat and/or radiation of a suitable wave-length, for instance ultraviolet light, upon the aqueous dispersion. If the polymerization is brought about by heating the aqueous dispersion at a temperature above about 86° C., it is necessary to carry out the polymerization in a sealed vessel under a superatmospheric pressure in order to keep the α-chloroacrylonitrile in the liquid phase. Most suitably the polymerization according to the process of the present invention is brought about by maintaining the aqueous dispersion at a temperature in the range 50–70° C.

By monomeric material comprising α-chloroacrylonitrile is meant throughout this specification α-chloroacrylonitrile, which may contain other copolymerizable monomeric compounds which are capable of copolymerizing with the α-chloroacrylonitrile. The monomeric material is distributed throughout the aqueous phase in the form of discrete globules. The distribution of these globules throughout the aqueous phase has to be maintained by mechanical means such as stirring or shaking, because, if the dispersion is left standing undisturbed, the globules will settle out and coagulate to form a separate phase.

In order to aid the dispersion of the monomeric material comprising α-chloroacrylonitrile throughout the aqueous phase it is necessary to add to the aqueous medium a polyfunctional, polymeric dispersing agent. By a polyfunctional, polymeric dispersing agent is meant a compound of relatively high molecular weight, most suitably above 1,000, which has the property of stabilizing and aiding the formation of dispersions of the oil-in-water type, but which does not cause the formation of stable emulsions of the oil-in-water type and which possesses a plurality of carboxyl and/or hydroxyl and/or amino groups in its molecular structure. Examples of such dispersing agents are gelatin, polyvinyl alcohol, polyacrylic acid, polymethacrylic acid, alginic acid, gum tragacanth, agaragar, glycol cellulose, carboxymethyl cellulose, starch and maleic acid-vinyl acetate and maleic acid-styrene copolymers. It should be noted that although other dispersing agents, which are not polyfunctional, polymeric agents of the type described above, may give satisfactory dispersions of α-chloroacrylonitrile in aqueous media, the polymerization of such dispersions does not proceed readily and such polymer as is produced tends to be badly discolored.

The concentration of the dispersing agent used in the process of the present invention may be varied widely and may be, for instance, as high as 10% on the aqueous phase. However, it is preferred to keep the concentration of the agent as low as possible so that the resultant polymer shall not be heavily contaminated with the agent used. In general the quantity of dispersing agent used is normally between 0.1% and 3% by weight on the aqueous phase.

It has been found that the presence of free molecular oxygen in an aqueous heterogeneous mixture of α-chloroacrylonitrile greatly reduces the rate of polymerization of the chloroacrylonitrile and that the resulting polymer is badly discolored and therefore the process of the present invention is carried out in the absence of molecular oxygen.

The prevention of the access of molecular oxygen to the polymerization reaction mixture may be brought about by any suitable means. For instance, dissolved atmospheric oxygen may be removed from the aqueous dispersion of the monomeric α-chloroacrylonitrile by such methods as boiling the mixture under reflux under reduced pressure or bubbling an inert gas such as nitrogen through the dispersion until all dissolved oxygen is replaced by the inert gas. After the de-oxygenating process the dispersion may be charged into an evacuated polymerization vessel fitted with suitable stirrers which is then sealed and the polymerization may thus be carried out therein in the absence of molecular oxygen. Alternatively, the polymerization may be carried out in an inert atmosphere obtained by replacing the air from any space above a de-oxygenated polymerization reaction mixture in the polymerization vessel with an inert gas such as nitrogen, or the air may be evacuated from any space above the de-oxygenated polymerization reaction mixture.

In order to bring about the polymerization of the α-chloroacrylonitrile under reasonable conditions of temperature or amounts of radiation it is necessary to add a peroxidic catalyst to the aqueous heterogeneous α-chloroacrylonitrile mixture. The peroxidic catalyst may be of the monomer- or water-soluble types.

As examples of monomer-soluble catalysts may be mentioned the organic peroxides and hydroperoxides such as acetyl, crotonyl, benzoyl, ortho-chlorobenzoyl and tertiary butyl peroxides and isopropylbenzene, diisopropylbenzene and pinane hydroperoxides, the esters of organic peracids such as tertiary butyl perbenzoate, tertiary butyl peracetate and isopropylbenzene perbenzoate and other peroxy compounds such as cyclohexyl hydroxy hydroperoxide.

As examples of water-soluble catalysts may be mentioned the inorganic peroxy-compounds such as hydrogen peroxide and the alkali metal and ammonium persulphates, perborates and percarbonates and the organic peroxy-compounds such as the water-soluble salts of mono-perphthalic acid, mono-persuccinic acid, perbenzoic acid and the like.

A particularly advantageous polymerization system for the process of the present invention is that known as the "redox" system in which a peroxidic catalyst is used in conjunction with an inorganic reducing agent. Such systems may be made up, for example, by the use of hydrogen peroxide, benzoyl peroxide or cumene hydroperoxide in conjunction with ferrous sulphate or by the use of sodium persulphate in conjunction with sulphur dioxide, sodium bisulphite, sodium sulphite, sodium hydrosulphite or sodium thiosulphate.

The quantity of peroxidic polymerization catalyst added to the polymerization reaction mixture may be varied considerably, but is usually in the range 0.1–5% by weight based on the polymerizable monomers taken. It is surprising that, while gaseous molecular oxygen has a marked discoloring effect on the polymeric material obtained from the polymerization of α-chloroacrylonitrile, pale or substantially colorless products are obtained when using peroxy catalysts.

The pH value of the aqueous phase of the polymerization reaction mixture according to the process of the present invention must be less than 7 i. e: an acid pH, if good yields of substantially colorless polymers derived from α-chloroacrylonitrile are to be obtained. The degree of acidity of the aqueous phase may be varied considerably but it is prefered that it should be in the pH range 2 to 4.

The molecular weight of the polymeric material obtained from α-chloroacrylonitrile by the process of the present invention may be controlled by carrying out the polymerization reaction in the presence of a chain transfer agent and in this way products may be obtained of such a molecular weight as to be useful for a particular purpose. Any transfer agent may be used which is effective under the conditions of the polymerization reaction and which does not adversely affect the color of the resulting polymeric material. As examples of preferred chain transfer agents may be mentioned carbon tetrachloride, carbon tetrabromide, triphenylmethane, thioacetic acid, n-octyl mercaptan and lauryl mercaptan.

The ratio of the polymerizable monomers to the aqueous phase in the process of the present invention may be varied considerably without affecting the color of the resultant polymeric material. However, from the practical point of view it is preferred that the ratio of polymerizable monomers to the aqueous phase shall lie in the range 1:3–1:10 by volume.

The process of the present invention may be applied to the polymerization of α-chloroacrylonitrile either alone to form poly-α-acrylonitrile or in the presence of other copolymerizable monomers to form copolymers therewith. Suitable copolymerizable monomeric compounds include compounds containing one or more ethylenic linkages as, for instance, vinyl acetate, vinyl chloride, vinyl pyridine, vinylidine chloride, acrylic acid and its homologues and their esters such as ethylacetate and methyl methacrylate, maleic and fumaric esters, styrene, isobutene, butadiene, copolymerizable vinyl and acrylic compounds generally and polymerizable olefinic and diolefinic hydrocarbons generally. The process of the present invention is particularly advantageous for the copolymerization of monomeric mixtures comprising a major proportion of alpha-chloroacrylonitrile and is particularly useful for those mixtures containing at least 85% by weight alpha-chloroacrylonitrile from which useful substantially colorless fibre- and film-forming copolymers may be obtained.

In the polymerization of a chloroacrylonitrile according to the present invention it has been discovered that the addition of certain salts has a marked synergetic effect upon the dispersing agent with the consequence that the rate and degree of polymerization of the mixture are improved. For instance, sodium pyrophosphate and sodium hypophosphite have a marked synergetic effect when used in conjunction with a gelatin dispersing agent. Accordingly, in a further embodiment of the present invention the process for the polymerization of α-chloroacrylonitrile is carried out in the presence of a salt having a synergetic effect upon the polyfunctional polymeric dispersing agent.

The following examples illustrate specific embodiments of the process of the present invention the parts referred to being by weight:

*Example 1*

A mixture of 10.9 parts of freshly distilled chloroacrylonitrile, 30 parts of air-free distilled water, 0.1 part of ammonium persulphate, 0.2 part of sodium metabisulphite, 0.06 part of gelatin (edible grade) and 0.072 part of sodium pyro-phosphate ($Na_4P_2O_7.10H_2O$) was sealed in a swan-necked reaction tube under carbon dioxide and submitted to end-over-end rotation at 55° C. for 24 hours. The tube was then cooled and opened. The aqueous phase had a pH of 2.3. The polymer was filtered off, washed and dried to yield 10.0 parts of a very fine almost white powder of poly-α-chloroacrylonitrile.

*Example 2*

The procedure of Example 1 was repeated but 0.08 part of ortho-chlorobenzoyl peroxide was used as catalyst. The aqueous phase had a final pH of 3.1 and the polymer was obtained as 10.3 parts of a very fine pale colored powder.

*Example 3*

The procedure of Example 1 was repeated but 0.2 part of potassium persulphate was used as catalyst and 0.7 part of sodium hypophosphite ($NaH_2PO_2.H_2O$) was added. The aqueous phase had a final pH of 2.6 and the polymer was obtained as 10.4 parts of a very fine slightly discolored powder.

*Example 4*

The procedure of Example 3 was repeated but 0.1 part of polyacrylic acid (prepared by the thermal polymerization of a 25% aqueous solution of acrylic acid at 125° C. for 40 hrs.) was used as dispersing agent instead of gelatin and sodium pyrophosphate. The aqueous phase had a final pH of 2.8 and the polymer was obtained as 10.0 parts of a very fine slightly discolored powder. Repetition of the above experiment replacing the polyacrylic acid with similarly prepared polymethacrylic acid gave essentially the same results.

*Example 5*

The procedure of Example 1 was repeated but 0.48 part of carbon tetrachloride was added to the monomer. The aqueous phase had a final pH of 2.1 and the polymer was obtained as 10.0 parts of a very white powder.

*Example 6*

The procedure of Example 1 was repeated but 0.1 part of carbon tetrabromide was added to the monomer. The aqueous phase had a final pH of 2.3 and the polymer was obtained as 10.3 parts of a very fine slightly discolored powder.

*Example 7*

The procedure of Example 1 was repeated but 0.17 part of lauryl mercaptan were added to the monomer. The aqueous phase had a final pH of 3.1 and the polymer was obtained as 9.9 parts of a very fine slightly discolored powder.

*Example 8*

The procedure of Example 1 was repeated except that the amount of sodium pyrophosphate was reduced to 0.03 part. The aqueous phase had a final pH of 2.0 and the polymer was obtained as 10.2 parts of a very fine white powder.

*Example 9*

The procedure of Example 1 was repeated but the gelatin dispersing agent was replaced with 0.5 part of starch and the quantity of sodium pyrophosphate added was increased to 0.1 part. The aqueous phase had a final pH of 2 and the polymer was obtained as 10.9 parts of fine pale-colored polymer.

*Example 10*

The procedure of Example 9 was repeated but the gelatin dispersing agent was replaced with 0.3 part of a poly-(vinyl alcohol) dispersing agent. The final pH of the aqueous phase was 2.0 and the polymer was obtained as 9.8 parts of slightly colored fine powder.

*Example 11*

The procedure of Example 1 was repeated but a mixture of 9.8 parts of α-chloroacrylonitrile and 1.064 parts of diethyl maleate was polymerized, yielding 10.1 parts of a fine white powder. The final pH of the aqueous phase was 2.0.

Other copolymers of α-chloroacrylonitrile may be obtained by repeating the procedure described in Example 11 but replacing the di-ethyl maleate employed therein with other monomers such as vinyl chloride, vinylidene chloride, ethyl acrylate, methyl methacrylate, styrene and butadiene.

The critical nature of the conditions of the process of the present invention is illustrated in the following processes where certain essential conditions are not observed.

The procedure of Example 1 was repeated except that the sodium pyrophosphate was replaced by 5 parts of trisodium orthophosphate ($Na_3PO_4.12H_2O$). After 24 hrs. the initially alkaline reaction mixture had become neutral owing to reaction between the polymer and/or monomer and the alkali and the product was 2.2 parts of a dark brown mass containing some monomer. This illustrates the need for acid polymerization conditions which was confirmed by reducing the amount of tri-sodium orthophosphate so that the initial reaction mixture was just acid when the polymerization proceeded satisfactorily.

The following process illustrates the ineffectiveness of dispersing agents which are not polyfunctional, polymeric compounds. The procedure of Example 1 was repeated but 0.02 part of o-chlorobenzoyl peroxide was used as catalyst and 0.1 part of sorbitan monostearate as dispersing agent. After 24 hours little polymerization had taken place and the solid present was brown and adhering to the walls of the tube.

The failure of a well-known non-peroxidic catalyst to bring about effective polymerization of α-chloroacrylonitrile is illustrated in the following. The procedure of Example 1 was repeated but 0.02 part of azo-bis-iso-butyronitrile was used as catalyst. The yield was reduced to 2.1 parts of dark brown beads and cake.

The following shows the strong inhibiting effect of molecular oxygen upon the polymerization reaction, and the gross discoloration of the product. The procedure of Example 2 was repeated but the monomer was not distilled in an atmosphere of nitrogen, the distilled water was not air-free, and the mixture was sealed under air instead of carbon dioxide. The yield consisted of 1.2 parts of a dark brown powder and scale.

The unsuitability of bulk polymerization for α-chloroacrylonitrile if substantially colorless products are to be obtained is shown in the following experiments. A solution of 0.003 part of caprylyl peroxide in 2.18 parts of α-chloroacrylonitrile sealed under nitrogen, was only 20% polymerized after 100 hours at 50° C.; the precipitated polymer was brown in color. Similarly a solution of 0.002 part of benzoyl peroxide in 2.18 parts of α-chloroacrylonitrile was 70% polymerized after 24 hours at 75° C.; the precipitated polymer was deep brownish-orange in color.

The polymers and copolymers produced by the process of the present invention may be readily dissolved in certain solvents and solvent mixtures and the solutions thus produced may be used for the preparation of shaped articles such as films and fibres comprising the α-chloroacrylonitrile polymer. Such processes are disclosed in copending applications Serial No. 403,635, filed January 12, 1954, and Serial Nos. 405,046 and 405,047, filed January 19, 1954.

I claim:

1. A process for the production of substantially colorless polymeric material which can be separated by filtration which comprises forming by mechanical means a dispersion of discrete globules of monomeric material comprising alpha-chloroacrylonitrile, through an aqueous phase having a pH value below 7, with the aid of a polyfunctional, polymeric dispersing agent, said dispersion being such that if left standing undisturbed, the monomeric globules settle out and coagulate to form a separate phase, and polymerizing said monomeric material.

2. A process as set forth in claim 1, wherein the polymerization is brought about by maintaining the aqueous dispersion at a temperature in the range 50 to 70° C.

3. A process as set forth in claim 1, wherein the dispersing agent is selected from the group consisting of gelatin, polyvinyl alcohol, polyacrylic acid, polymethacrylic acid, alginic acid, gum tragacanth, agar-agar, glycol cellulose, carboxy methyl cellulose, starch, and maleic acid-vinylacetate and maleic acid-styrene copolymers.

4. A process as set forth in claim 1, wherein the concentration of the dispersing agent is between 0.1% and 3% by weight on the aqueous phase.

5. A process as set forth in claim 1, wherein the pH value of the aqueous phase is in the range 2 to 4.

6. A process as set forth in claim 1, wherein the polymerization is carried out in the presence of a chain transfer agent.

7. A process as set forth in claim 1, wherein the monomeric material comprises at least 85% by weight of alpha-chloroacrylonitrile.

8. A process for the production of polymeric material which comprises polymerizing an aqueous dispersion of monomeric material comprising at least 85% by weight of alpha-chloroacrylonitrile in the absence of free molecular oxygen and in the presence of a peroxidic catalyst used in conjunction with sodium metabisulphite, and a gelatin dispersing agent used in conjunction with sodium pyrophosphate, the pH value of the aqueous phase being between 2 and 4.

9. Polymeric material when produced by a process as set forth in claim 1.

References Cited in the file of this patent

UNITED STATES PATENTS

| | | |
|---|---|---|
| 2,486,241 | Arnold | Oct. 25, 1949 |
| 2,631,997 | Stewart | Mar. 17, 1953 |
| 2,671,072 | Ham et al. | Mar. 2, 1954 |